United States Patent
Dellmann et al.

(10) Patent No.: US 8,947,829 B2
(45) Date of Patent: Feb. 3, 2015

(54) TAPE HEAD SYSTEM WITH CONTROLLABLE ELECTROSTATIC ELEMENTS

(71) Applicant: International Business Machines Corporation, Armonk, NC (US)

(72) Inventors: Laurent A. Dellmann, Rueschlikon (CH); Johan B. C. Engelen, Rueschlikon (CH); Simeon Furrer, Rueschlikon (CH); Mark A. Lantz, Rueschlikon (CH); Hugo E. Rothuizen, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/918,123

(22) Filed: Jun. 14, 2013

(65) Prior Publication Data

US 2014/0002928 A1 Jan. 2, 2014

(30) Foreign Application Priority Data

Jun. 28, 2012 (GB) .................................. 1211469.0

(51) Int. Cl.
| | | |
|---|---|---|
| *G11B 5/584* | (2006.01) | |
| *G11B 15/64* | (2006.01) | |
| *G11B 5/29* | (2006.01) | |
| *G11B 5/008* | (2006.01) | |
| *G11B 5/58* | (2006.01) | |

(52) U.S. Cl.
CPC ............ *G11B 15/64* (2013.01); *G11B 5/00826* (2013.01); *G11B 5/581* (2013.01)
USPC ....................... 360/130.21; 360/231; 360/121

(58) Field of Classification Search
CPC ........................................................ G11B 5/581
USPC ......... 360/83, 85, 90, 93, 95, 96.1–96.4, 231, 360/241, 291–292, 130.21
See application file for complete search history.

(56) References Cited

U.S. PATENT DOCUMENTS

| | | | |
|---|---|---|---|
| 3,045,884 A | | 7/1962 | Buhrendorf |
| 5,055,731 A | * | 10/1991 | Nihei et al. ................ 360/78.12 |
| 5,103,362 A | | 4/1992 | Belser et al. |
| 5,353,182 A | | 10/1994 | Nakamura et al. |
| 6,588,095 B2 | | 7/2003 | Pan |
| 8,035,919 B2 | | 10/2011 | Yari et al. |
| 8,111,487 B2 | | 2/2012 | Lauer |
| 2001/0055183 A1 | | 12/2001 | Cain et al. |
| 2003/0043491 A1 | | 3/2003 | Riddering et al. |

(Continued)

FOREIGN PATENT DOCUMENTS

EP 0411476 A1 2/1991

(Continued)

OTHER PUBLICATIONS

UK Intellectual Property Office; Application No. GB1211469.0; Patents Act 1977: Search Report under Section 17(5); Date Mailed: Oct. 18, 2012; pp. 1-4.

*Primary Examiner* — Craig A. Renner
(74) *Attorney, Agent, or Firm* — Cantor Colburn LLP

(57) ABSTRACT

A tape head system includes a read and/or write head having at least one read and/or write element configured to read from and/or write to magnetic tape and at least one electrostatic element arranged adjacent to the read and/or write element; and a controller configured to apply a potential to the at least one electrostatic element.

12 Claims, 9 Drawing Sheets

(56) References Cited

U.S. PATENT DOCUMENTS

| | | |
|---|---|---|
| 2003/0043497 A1* | 3/2003 | Riddering et al. .............. 360/75 |
| 2008/0117539 A1 | 5/2008 | Bui et al. |
| 2008/0221981 A1 | 9/2008 | Biskeborn |

FOREIGN PATENT DOCUMENTS

| | | |
|---|---|---|
| EP | 0447081 A1 | 9/1991 |
| EP | 0690442 A2 | 1/1996 |
| JP | 2000251353 A | 9/2000 |

* cited by examiner

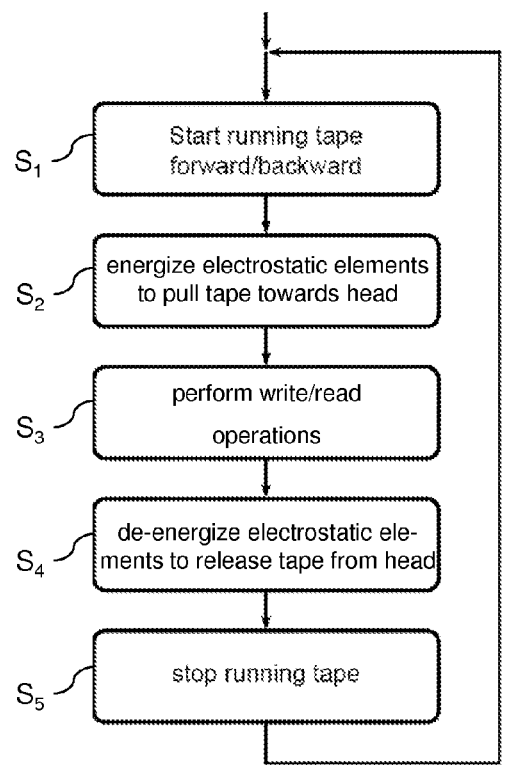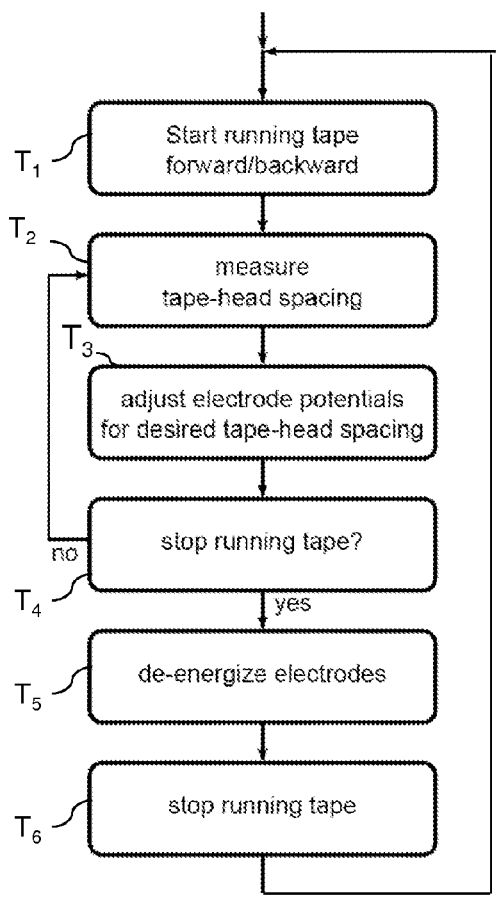
Fig. 2
Fig. 3

(VI – VI)

(X-X)

TAPE HEAD SYSTEM WITH CONTROLLABLE ELECTROSTATIC ELEMENTS

PRIORITY

This application claims priority to Great Britain Patent Application No. 1211469.0, filed Jun. 28, 2012, and all the benefits accruing therefrom under 35 U.S.C. §119, the contents of which in its entirety are herein incorporated by reference.

BACKGROUND

The invention relates to a tape head system and to a method for operating a tape head system.

In modern tape systems, data is organized in data tracks which are written and read back in a parallel fashion by a read and write head comprising servo read, data read and data write elements, i.e., transducer elements. These data tracks run in the longitudinal direction of the magnetic tape and are much narrower than the excursions the magnetic tape experiences in the lateral direction as a result of imperfections in the mechanical entrainment system. Therefore, it is crucial to accurately position the head relative to the magnetic tape in the lateral direction, and to maintain this relative position as the magnetic tape is streamed. To this end, as well as for other purposes, media manufacturers write servo tracks on the magnetic tape parallel to and interleaved with the data tracks. The servo read elements read the servo information stored in the servo tracks, which is then used for aligning the head with the data tracks on the magnetic tape.

Servo tracks are typically written to the magnetic tape using one servo write element for each servo track. Each servo write element generally comprises a yoke having one or more gaps and a coil for producing a magnetic field at each gap. The write elements are configured to imprint a specific pattern on the magnetic tape via fringing magnetic fields. This pattern contains the information required to determine the instantaneous lateral location of the data read and write elements (or the head as a whole) using a timing-based-servo (TBS) scheme as for example described in EP 0 690 442 A2.

TBS is a technology that was developed specifically for linear tape drives. It has been adopted by the Linear Tape Open (LTO) Consortium as a standard for the so-called LTO tape drive systems. In TBS systems, servo patterns generally comprise chevron shapes, having magnetic transitions with two different azimuthal slopes. An estimate of the head position is derived from the relative timing of pulses (also known as di-bits) generated by the read element reading the servo pattern.

Generally speaking, the magnetic tape should be in close contact with the servo write element to ensure a high-quality servo pattern being imprinted during writing. When the magnetic tape is run across the servo write head, an air bearing layer forms (air being trapped between the magnetic tape and the servo write head). Current servo write heads use one or more sharp edges to skive off the air. A small low pressure pocket forms behind the skiving edge, and atmospheric pressure then pushes the magnetic tape into contact with the servo write head.

SUMMARY

In one embodiment, a tape head system includes a read and/or write head having at least one read and/or write element configured to read from and/or write to magnetic tape and at least one electrostatic element arranged adjacent to the read and/or write element; and a controller configured to apply a potential to the at least one electrostatic element.

BRIEF DESCRIPTION OF THE SEVERAL VIEWS OF THE DRAWINGS

FIG. 2 shows a flowchart of a method according to one embodiment;

FIG. 3 shows a flowchart of a method according to a further embodiment;

DETAILED DESCRIPTION

Figure 1:
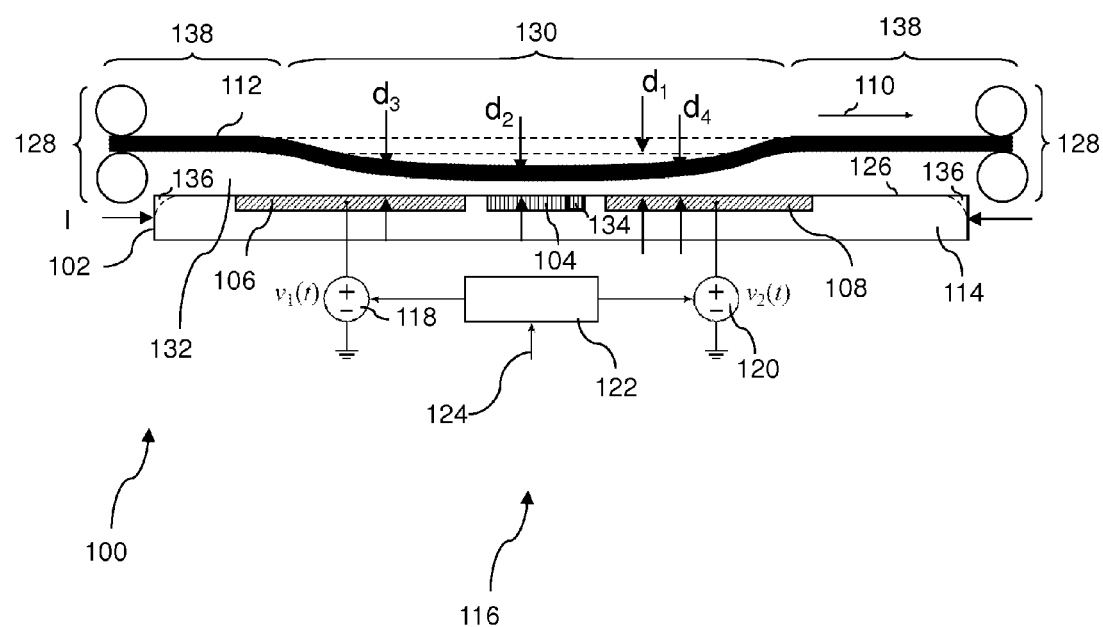
FIG. 1 shows schematically a cross-section of a tape head system according to one embodiment.

According to a first aspect, a tape head system is provided. The tape head system comprises a read and/or write head having at least one read and/or write element for reading from and/or writing to magnetic tape and at least one electrostatic element arranged adjacent to the read and/or write element. Further, the tape head system comprises a controller for applying a potential to the at least one electrostatic element.

One general idea is that by applying a defined potential to the at least one electrostatic element, the electrostatic element can be controlled so as to exert an electrostatic force on the magnetic tape. In doing this, a distance between the read and/or write head or the read and/or write element and the magnetic tape may be controlled. For example, the distance may thus be controlled to be equal to zero (when the magnetic tape contacts the read and/or write head) or in the region between 0 and 20 µm, specifically 0 and 10 µm, and more specifically 0 and 1 µm (herein referred to as "close relationship"). The force pulling the magnetic tape towards the read and/or write head or the read and/or write element may also be controlled. The force may be controlled to be in the range of 0 to 10 N, for example. The force is dependent on the applied voltage and the surface area spanned by the electrostatic elements; a higher voltage results in more force, and a smaller surface area results in a smaller force. The controller may be configured as an open or closed-loop feedback controller to control the distance.

Typically, magnetic tape comprises a number of thin conductive and dielectric layers. Thus, when the magnetic tape is brought close to the at least one electrostatic element, image charges appear on the magnetic tape, i.e., there is a charge separation within the tape due to the external electric field generated by the at least one electrostatic element, when the potential is applied by the controller. As a result, the magnetic tape is attracted to the at least one electrostatic element.

Furthermore, by statically or dynamically controlling the potential applied to the at least one electrostatic element by the controller, the electrostatic force exerted on the magnetic tape may be controlled to achieve the desired spacing or force mentioned above.

The write head may be formed as a servo write head. At least one write element of the write head may comprise a yoke having at least one, optionally at least two gaps, and a coil for producing a magnetic field at the gap. Typically, the coil comprises a plurality of windings. A "gap" presently refers to an interruption in the yoke defined between opposite magnetic poles. The yoke comprises a magnetic material, for example iron, and is magnetized when a current flows through the coil. The yoke may be ring-shaped.

The head, in particular the read and/or write element(s), may be assembled from separately fabricated parts, or built-up from a planar substrate using thin-film microfabrication techniques. The latter presents advantages in terms of fabrication and decreased inductance and current, which enable writing more abrupt servo patterns and/or formatting the magnetic media at a greater speed. For example, the head and/or the read and/or write element may be built on a wafer, for example a silicon or AlTiC (Aluminium-Titanium-Carbide) wafer.

The head, in particular the servo write head, may be a planar head comprising a planar (also referred to as pancake) coil. Alternatively, the head, in particular the servo write head, may be comprise with a helical coil. A combination of planar or helical coils is also possible.

Generally speaking, the at least one read and/or write element may be configured for writing and/or reading data or servo tracks.

According to an embodiment, the controller is configured to ground the at least one electrode. When the magnetic tape moves over the read and/or write head during reading or writing, this results in friction causing triboelectric charging of the head surface. This charging creates an attractive electrostatic force increasing the pressure at which the magnetic tape is pushed against the head. This in turn increases friction and wearing of the head. The increased friction leads to increased velocity variations of the magnetic tape. When a servo pattern is written, these velocity variations lead to an imprinted noise on the TBS position measurement. By now grounding the at least one electrode, the triboelectric charge is removed. Thus, the attractive electric forces between the magnetic tape and the head surface are brought down to substantially zero. Thus, friction is reduced, and the velocity variations as mentioned above are substantially avoided resulting in an accurate TBS position measurement. The electrostatic element may be formed as a metal island integrated into the head surface. The metal island may be configured such that it also reduces wear on the head besides its grounding effect. Multiple of these metal islands may be provided on the head surface. In particular, these metal islands may be provided on a servo write head surface.

According to a further embodiment, the controller is configured to apply a potential to the at least one electrode so as to compensate for a work function. Due to the different materials used for the magnetic tape and the head surface, a small potential results, when these materials are brought into a close relationship or in contact with each other. The work function is defined as the minimum energy (usually measured in electron volts) needed to remove an electron from the (solid) material to a point immediately outside the (solid) material surface. In this context, "immediately" means that the final electron position is far from the surface on the atomic scale, but still close to the solid on the microscopic scale. When the potential applied to the at least one electrode corresponds to the work function, attractive forces between the magnetic tape and the head surface may be reduced even more compared to the embodiment where the at least one element is grounded. Thus, substantially no electrostatic force acts on the magnetic tape during reading and/or writing.

According to a further embodiment, the controller is configured to apply a potential to the at least one electrode so as to maintain a controlled spacing between the magnetic tape and the head, the controller being configured as a closed-loop feedback controller so as to maintain the controlled spacing between the magnetic tape and the head. The controlled spacing (or air bearing) may be formed such that the magnetic tape is always kept at a distance from the surface of the head. Thus, the magnetic tape does not contact the surface of the head at any point. Alternatively, the magnetic tape may contact the surface of the head at one or more sections. At the same time, one or more air bearings are present between the magnetic tape and the head surface in one or more other sections of the head.

According to a further embodiment, the controller is configured to apply a potential to the at least one electrode so that the magnetic tape contacts the head along a first section of the head comprising the read and/or write element or is arranged in close relationship thereto and is spaced apart from the head along a second section of the head adjacent to the first section of the head by an air bearing. Thus, the area of the magnetic tape that is in contact with the head can be significantly reduced. Only the areas of the magnetic tape, which are read from or written to, are in contact with the head or the read and/or write element. Thus, friction between the magnetic tape and the head is controlled allowing for, e.g., improved accuracy when writing a servo pattern. Also, by controlling the potential at the at least one electrostatic element accordingly, the attractive force between the magnetic tape and the head can be controlled so as to reduce friction even further.

According to one embodiment, the at least one electrode is provided with a non-conductive layer on the side facing the magnetic tape. In particular, where electrically conducting tape is used, this will prevent shorting between multiple electrostatic elements. Or, a non-conducting tape is used. "Conducting" or "non-conducting" may refer to only one side of the tape, i.e., the side of the tape in contact or in close relationship with the head surface or the read and/or write element.

According to a further embodiment, at least two electrostatic elements are arranged before and after the read and/or write element in a direction of travel of the magnetic tape. Thereby, the magnetic tape may be accurately positioned with respect to the read and/or write element.

According to a further embodiment, the first section of the head in contact or in close relationship with the magnetic tape spans only from the one electrostatic element to the other electrostatic element with the read and/or write element arranged in between. Thus, the magnetic tape is only in contact with a section of the head. The magnetic tape may only be partially in contact or in close relationship with each electrostatic element.

According to a further embodiment, at least a first and a second electrostatic element are arranged before and at least a third and fourth electrostatic element are arranged after the at least one read and/or write element. By having multiple electrostatic elements arranged before and after the read and/or write element, electrostatic attractive forces between the magnetic tape and the head may be better controlled.

According to a further embodiment, the controller may be configured to apply the same or opposite potentials to the electrostatic elements. "Same" means same magnitude and polarity, and "opposite" means same magnitude, but opposite polarity. A bi-polar arrangement, that is using electrostatic elements having opposite potentials, may be preferable, since charges on the head surface and in the magnetic tape may be controlled more easily.

According to a further embodiment, the controller is configured to apply opposite potentials to the first and second electrostatic elements as well as to the third and fourth electrostatic elements. Thus, the charges on the first and second electrostatic element are equal and opposite, such that the magnetic tape has no net charge and is substantially at ground potential. Similarly, the charges on the third and fourth electrostatic element are equal and opposite such that the magnetic tape has no net charge and is at virtual ground potential. Thereby, an electrostatically balanced arrangement is obtained (bi-polar configuration).

According to a further embodiment, the first and second and/or third and fourth electrostatic element are arranged, having regard to a direction of travel of the tape, behind or next to each other. "Next" means in the transversal direction of the tape.

According to a further embodiment, the at least one electrostatic element and the at least one read and/or write element form a cluster, wherein multiple clusters are arranged on the head. For example, the distance between respective electrostatic elements and read and/or write elements of each cluster are smaller than the distances between the clusters.

According to a further embodiment, the controller is configured to control the at least one electrostatic element of each cluster so that the magnetic tape only contacts or is arranged in close relationship with the head along first sections of the head and is spaced apart from the head at second sections of the head in between the first sections by an air bearing respectively.

The head is configured with a bevel at at least one of the second sections. The bevel may be formed concave, i.e., the bevel curves into the material of the head. Thereby, it is ensured that the magnetic tape only touches the head at the first sections, thus keeping friction at a minimum.

According to a further embodiment, the tape head system comprises a tensioning unit for tensioning the magnetic tape, wherein the controller is configured to apply a potential to the at least one electrostatic element so as to pull the magnetic tape towards the read and/or write head for reading and/or writing. The controller may be configured to apply a potential to the at least one electrode so as to pull the magnetic tape towards the head for reading and/or writing even when the magnetic tape is spaced from the head by a distance between 0.1 and 100 µm. Stiction between the magnetic tape and the head surface is a result of the trend to use increasingly smooth materials. The use of smooth materials can, particularly at low or zero velocity of the magnetic tape, cause the magnetic tape to stick to the head due to stiction effects. When removing the magnetic tape from the head, this may cause damage to the magnetic tape. According to the embodiment, simply by controlling the potential applied at the at least one electrostatic element, the magnetic tape may be removed from the head in a controlled fashion. For example, by reducing the electrostatic attractive forces between the magnetic tape and the at least one electrostatic element, the magnetic tape is removed from the head due to the tension in the magnetic tape produced by the tensioning unit.

Further, a method for operating a tape head system, in particular a tape head system in accordance with the present invention, is provided. A potential is applied to at least one electrostatic element of a read and/or write head of the tape head system arranged adjacent to at least one read and/or write element of the read and/or write head by a controller of the tape head system.

Features and advantages explained above in the context of the tape head system apply mutatis mutandis to the method of the present invention.

In the following, exemplary embodiments of the present invention are described with reference to the enclosed figures.

FIG. 1 shows a tape head system 100 according to one embodiment. The tape head system 100 comprises a read and/or write head 102 having one read and/or write element 104. Also, the head 102 has two electrostatic elements 106, 108 arranged adjacent to and, having regard to a direction of travel 110 of a magnetic tape 112, before and after the read and/or write element 104. The read and/or write element 104 and the electrostatic elements 106, 108 may be arranged on a substrate 114 of the head 102. The substrate 114 may be formed as a wafer, for example a silicon or AlTiC wafer. The elements 104, 106, 108 are electrically isolated from each other. The electrostatic elements 106, 108 may comprise titanium-nitride (TiN), iron-nitride and an additional element X (FeXN where X=Ti, Al, Hf, CoHf or CrHf), nickel-iron (NiFe), doped diamond like carbon (DLC), tungsten or, generally, any suitable metal.

The tape 112, which is also part of the tape head system 100, is fed past the front surface 126 of the head 102 having the elements 104, 106, 108 integrated therein.

Further, the tape head system 100 comprises a controller 116 for applying a potential $V_1$, $V_2$ to the electrostatic elements 106, 108. The controller 116 may comprise a first voltage source 118 applying a voltage $V_1$ to the electrostatic element 106. Further, the controller 116 may comprise a voltage source 120 for applying a voltage $V_2$ to the electrostatic element 108. The voltage sources 118, 120 may be configured as controllable voltage sources. For example, a unit 122 may be provided, which controls the voltages $V_1$, $V_2$ applied to the electrostatic elements 106, 108. Thus, the voltages $V_1$, $V_2$ may vary as a function of time t. The unit 122 may receive an input signal 124 from a main controller (not shown) of the tape head system 100.

The tape head system 100 may also comprise tensioning units 128. The tensioning units 128 may be arranged on either side of the tape head 102 and apply a tension to the magnetic tape 112. As a result, when no electric potential is applied to the electrostatic elements 106, 108, the tape 112 is spaced apart from the surface 126 over the length l of the head 102 as indicated by the dotted lines in FIG. 1. The distance $d_1$ from the surface 126 to the magnetic tape 112 may be large, for example between 1 and 100 µm.

When data is to be read from or written to the tape 112, or a servo pattern is to be written to or read from the tape 112, a voltage $V_1$, $V_2$ is supplied to the electrostatic elements 106, 108 by the controller 116, when the input signal 124 indicates to the controller 116 that a read and/or write operation is to be performed. As a result of electrostatic forces between the electrostatic elements 106, 108 and the tape 112, a section 130 of the tape 112 is pulled in close relationship to the surface 126 of the head 102. The distance $d_2$ between the read and/or write element 104 and the tape 112 at the section 130 may be in the range of 10 to 200 nm or less. Also, the distances $d_3$ and $d_4$ between a respective electrostatic element 106, 108 and the tape 112 at the section 130 may lie, for at least a part of a respective electrostatic element 106, 108 between the distances $d_1$ and $d_2$. The sections 138 of the tape 112 may remain at the distance $d_1$.

As the tape 112 is moved past the head 102 using one or more electric motors (not shown), the read and/or write element 104 writes to or reads from the tape 112. Once the read and/or write process is completed, a corresponding signal 124 is provided to the controller 116 and thus no potentials are applied to the electrostatic elements 106, 108. Then, the section 130 returns to its original position indicated by dotted lines in FIG. 1 due to the tension in the tape 112.

As can be seen from FIG. 1, an air bearing 132 is present between the head 102 and the tape 112 even during reading and/or writing. The air bearing 132 may be present over the entire length l of the head 102. In an alternative embodiment (see FIG. 4), no air bearing may be present at the section 130. In the latter case, the section 130 of the tape 112 is in direct contact with the read and/or write element 104 and the electrostatic elements 106, 108 (or at least with portions of the elements 106, 108). According to a further alternative embodiment, only the read and/or write element 104 is in direct contact with the section 130 of the tape 112.

The tensioning unit 128 is an optional feature and reading and/or writing may still be performed as illustrated by the embodiment of FIG. 1. The tensioning unit 128 is, however, advantageous in removing the tape 112 from the head 102. Tension may also be provided and controlled by controlling the torque applied by the electric motors used to move the tape 112 past the head 102.

It is to be noted that the head 102 does not have a skiving edge to produce a reduced pressure region between the tape 112 and the surface 126 of the head 102 in order to ensure contact between the tape 112 and the read and/or write element 104. However, such a skiving edge may be present. The head 102 may be formed with rounded edges 136 as illustrated in dotted lines in FIG. 1 at opposing ends in the direction of travel 110 of the tape 112.

By maintaining the air bearing 132, triboelectric charging of tape 112 is prevented, thus reducing or preventing friction between the tape 112 and the head 102. This again reduces velocity variations of the tape 112 in the direction of travel 110, which improves reading and/or writing quality.

Also, the controller 116 can control the potentials $V_1$, $V_2$ continuously, i.e., as a function of time, in order to keep the distance $d_2$ at an ideal level. Also, the controller 116 may control the distance $d_2$ as a function of the distance $d_2$. In other words, the distance $d_2$ is provided as the input signal 124 to the unit 122. For example, a sensor 134 measuring the distance $d_2$ may be integrated into the head 102, for example into the read and/or write element 104. The sensor 134 then produces the input signal 124. Thus, a closed loop control system is provided, which allows accurate control of the distance $d_2$.

With reference to FIG. 2, a method for operating the tape head system 100 of FIG. 1 is illustrated according to one embodiment.

In a first operation, S1, the tape 112 is started to run forward or backward.

In operation S2, the electrostatic elements 106, 108 are energized and thus pull the tape 112 close to the head 102.

In operation S3, writing and/or reading (reading is presently also to encompass "seeking") operations. For example, the read and/or write element 104 writes data to the tape 112. The read and/or write element 104 could just as well write a servo pattern to the tape 112.

In operation S4, the electrostatic elements 106, 108 are de-energized, i.e., no voltage $V_1$, $V_2$ is applied, to release the tape 112 from the head 102.

In operation S5, the tape 112 is stopped. The operations S1 to S5 may be repeated as needed.

FIG. 3 illustrates a method for operating a tape head system 100 according to a further embodiment.

In a first operation, T1, the tape 112 is started to run forward or backward, corresponding to operation S1 mentioned above.

Then, the distance D1 is measured for example by the sensor 134 (step T2).

In operation T3, the controller 116 adjusts the voltages $V_1$, $V_2$ to achieve the desired distance $d_2$.

In another operation (not specifically shown in FIG. 3 since this operation corresponds to operation S3 mentioned above), writing and reading operations are performed.

In operation T4, it is decided whether to stop running the tape 112. If no, operations T2, T3 and the writing and reading operations are repeated. If yes, the electrostatic elements 106, 108 are de-energized in a operation T5 to release the tape 112 from the head 102.

In operation T6, which corresponds to operation S5 mentioned above, the tape 112 is stopped.

If desired, the operations T1 to T6 and the writing and reading operations may be repeated as often as required.

Figure 4:
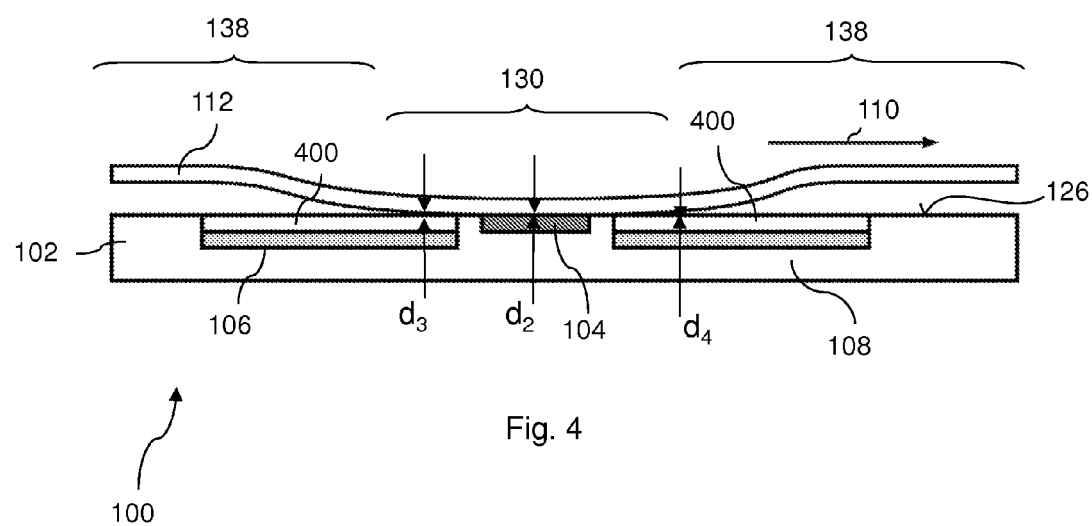
FIG. 4 shows schematically a cross-section of a tape head system according to a further embodiment.

FIG. 4 partially illustrates a tape head system 100 according to a further embodiment. The tape head system 100 of FIG. 4 differs from the one of FIG. 1 in that insulating layers 400 are provided on top of each electrostatic element 106, 108. In particular in cases where the tape 112 touches the electrostatic elements 106, 108 and is formed from conductive material, the insulating layers 104 prevent shorting of the electrostatic elements 106, 108.

The insulating layers 400 may be formed from a material having a thickness of hundreds of nanometers or less. The material used for the insulating layers 400 may comprise diamond like carbon (DLC), tetrahedral amorphous carbon (TaC), silicon nitride, silicon dioxide, aluminum oxide, hafnium oxide, silicon carbide.

As opposed to FIG. 1, no air bearing is maintained along the length of the section 130 of the tape 112. Rather, the tape 112 is in direct contact with the read and/or write element 104 and parts of the electrostatic elements 106, 108 at the section 130. However, the attractive force pushing the section 130 of the tape 112 against the head 102 may be controlled by the controller 116 (not shown in FIG. 4, but illustrated in FIG. 1). Thus, by choosing the potentials $V_1$, $V_2$ applied to the electrostatic elements 106, 108 appropriately, friction between the tape 112 and the head 102 can be reduced on the one hand. On the other hand, close enough contact between the tape 112 and the surface 126 is ensured for optimal reading and writing.

Figure 5:
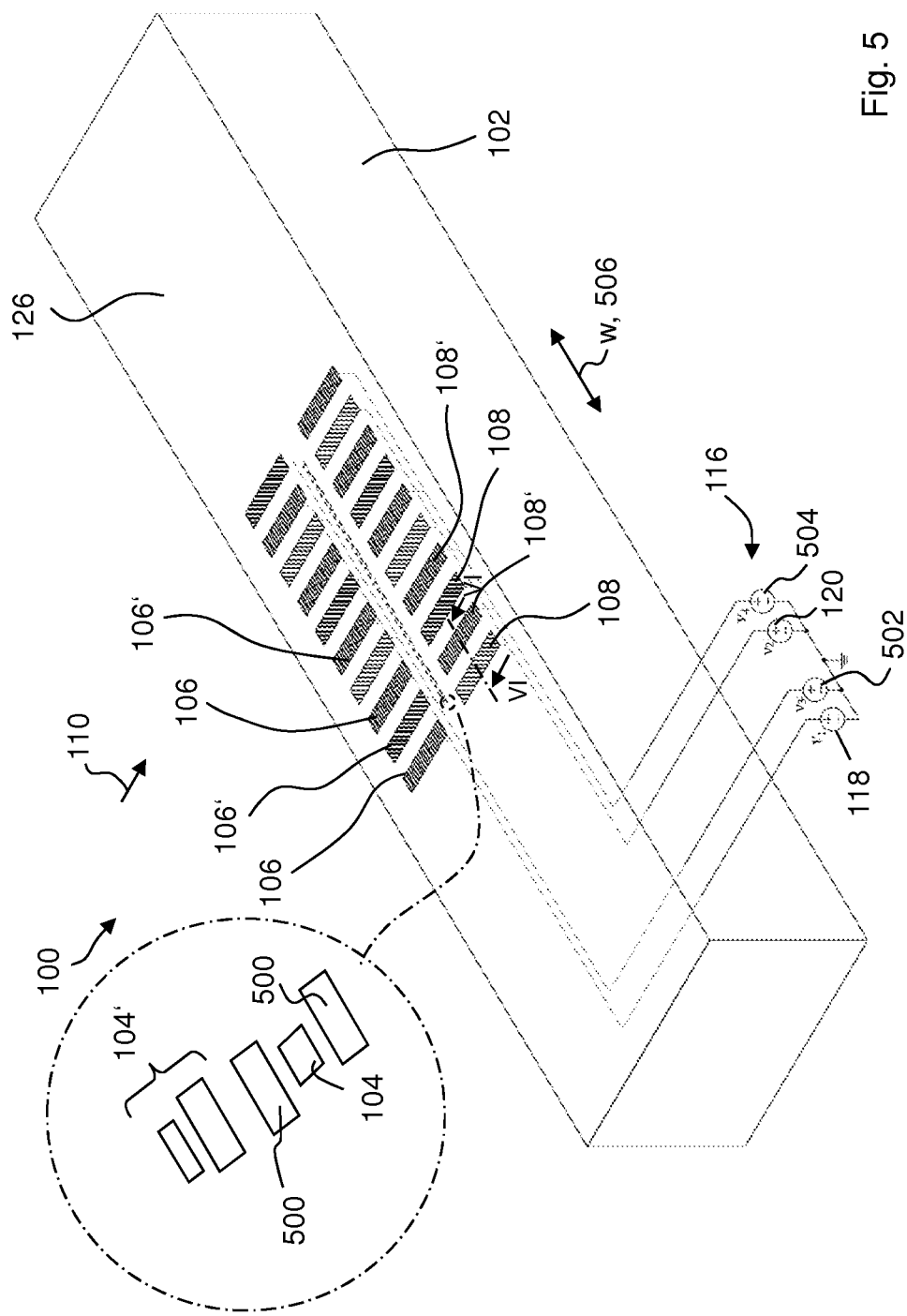
FIG. 5 shows a perspective view of a tape head system according to a further embodiment.

FIG. 5 illustrates in a perspective view a tape head system 100 according to a further embodiment.

According to the embodiment of FIG. 5, the head 102 is formed as a data read and write head. Thus, the head 102 comprises servo read, data read, and data write elements 104 (also see the enlargement in FIG. 5). Before and after the read elements 104, having regard to the direction of travel 110 of the tape 112, shields 500 may be arranged. The shields 500 limit the spatial extent of the magnetic field detected by the read elements 104. In order to reduce chemical reactions on the read elements 104 or the shields 500 themselves, the shields 500 may be electrically biased, for example at a potential of less than 1.5 V. Similarly, the pole pieces of the write elements 104' may also be electrically biased, for example at a potential of less than 1.5 V to reduce chemical reactions.

Multiple electrostatic elements 106, 106' are arranged alternatingly in the direction of the width w of the head 102. The width w corresponds to the direction 506 crosswise to the direction of travel 110 of the tape 112. Also, electrostatic elements 108, 108' are arranged alternatingly in the direction of the width w of the head 102. The read and write elements 104 are arranged in the gap defined between the electrostatic elements 106, 106' and 108, 108'.

The electrostatic elements 106 are connected to a voltage source 118, the electrostatic elements 106' to a voltage source 502, the electrostatic elements 108 to a voltage source 120 and the electrostatic elements 108' to a voltage source 504. Thus, the electrostatic elements 106, 106', 108, 108' have a voltage $V_1$, $V_3$, $V_2$, $V_4$ applied to them, respectively.

For example, the controller 116 may simply ground the electrostatic elements 106, 106', 108, 108'. In this case, the voltage sources 118, 502, 120, 504 are set to 0 V (in other words, the voltage sources are not necessarily required). As a result, triboelectric charges, which may result from the tape 112 contacting the surface 126 are conducted into the ground and thus taken away. In this manner, friction can be reduced as explained above.

Further, the controller 116 may control the voltage sources 118, 502, 120, 504 so as to compensate for a work function of the tape 112 and the read and write elements 104 (or other elements for that matter). The work function is a result of two different materials coming into contact, which thus produces a voltage, which in turn may cause attractive forces between the tape 112 and the head 102 leading to friction. The work function may be compensated for by applying a voltage to the electrostatic elements 106, 106', 108, 108' that minimizes the electrostatic attractive force between the tape 112 and the electrostatic elements 106, 106', 108, 108'.

As another alternative embodiment, the controller 116 controls the electrostatic elements 106, 106', 108, 108' so as to dynamically control the distance $d_2$ as explained in FIGS. 1 and 4.

The electrostatic elements 106 and 106' may be merged into a single electrostatic element, to attract the tape 112 for all read and/or write elements. Also, the electrostatic elements 108 and 108' may be merged into a single electrostatic element to attract the tape 112 for all read and/or write elements 104.

Figure 6:
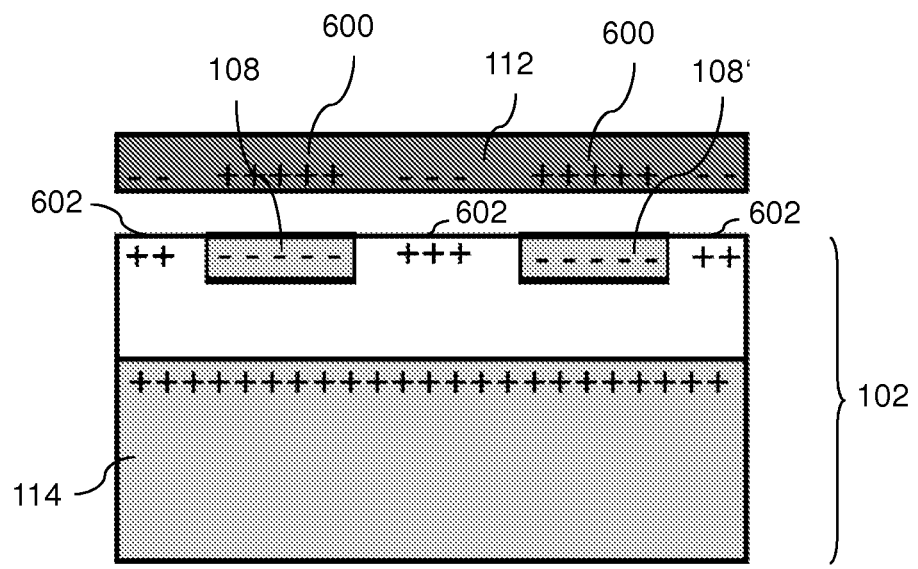
FIG. 6 shows schematically a section VI-VI taken from FIG. 5.

FIG. 6 shows a cross-section VI from FIG. 5.

According to the embodiment of FIG. 6, the same voltages $V_2$, $V_4$ are applied to the electrostatic elements 108, 108' in terms of magnitude and polarity. As a result, opposite charges 600 (so-called image charges) form in the tape 112. Consequently, the tape 112 is attracted towards the head 102. At the same time, opposite charges 602 are formed between the electrostatic elements 108, 108'. As a result, the substrate 114 is also at a (positive) potential.

Figure 7:
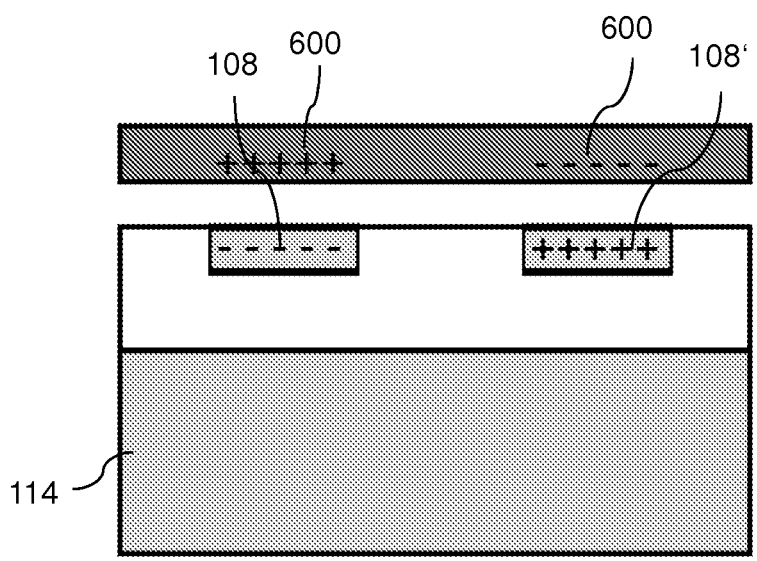
FIG. 7 shows the section from FIG. 6 according to a further embodiment.

FIG. 7 shows an embodiment with a bipolar configuration of the electrostatic elements 108, 108'.

According to the embodiment of FIG. 7, voltages $V_2$, $V_4$ are applied to the electrostatic elements 108, 108' of equal magnitude, yet opposite polarity. Thus, opposite charges 600 (image charges) are formed in the tape 112. However, the opposite charges 600 in the tape 112 balance each other out, the tape 112 thus being at a potential of 0 V.

Also, substantially no opposite charges 602 are formed between the electrostatic elements 108, 108' (as opposed to the embodiment of FIG. 6).

Further, since the charges on the electrostatic elements 108, 108' balance each other out, the substrate 114 is substantially not charged, i.e., the substrate 114 is at 0 V.

Figure 8:
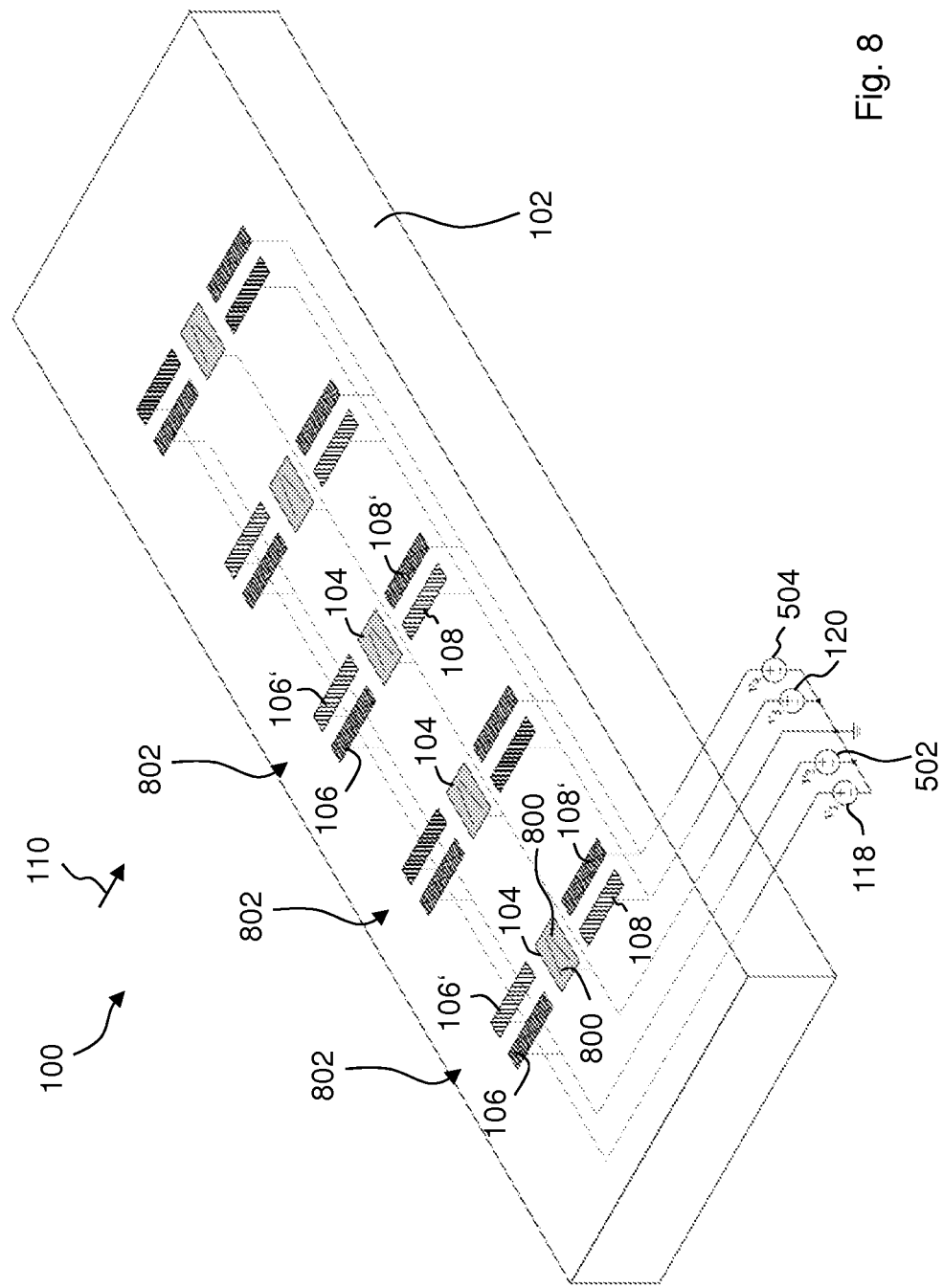
FIG. 8 shows a perspective view of a tape head system according to a further embodiment.

FIG. 8 shows in a perspective view a tape head system 100 according to a further embodiment.

The embodiment according to FIG. 8 differs from the embodiment of FIG. 5 in that the elements 104 are formed as servo write elements. Each servo write element 104 comprises, for example, two gaps 800 for writing a chevron servo pattern on the tape 112 (not shown).

Having regard to the direction of travel 110 of the tape 112, two pairs of electrostatic elements 106, 106' and 108, 108' are arranged adjacent to each write element 104, thus forming clusters 802.

The explanations in connection with FIGS. 5 to 7 apply mutatis mutandis to the embodiment of FIG. 8.

Figure 9:
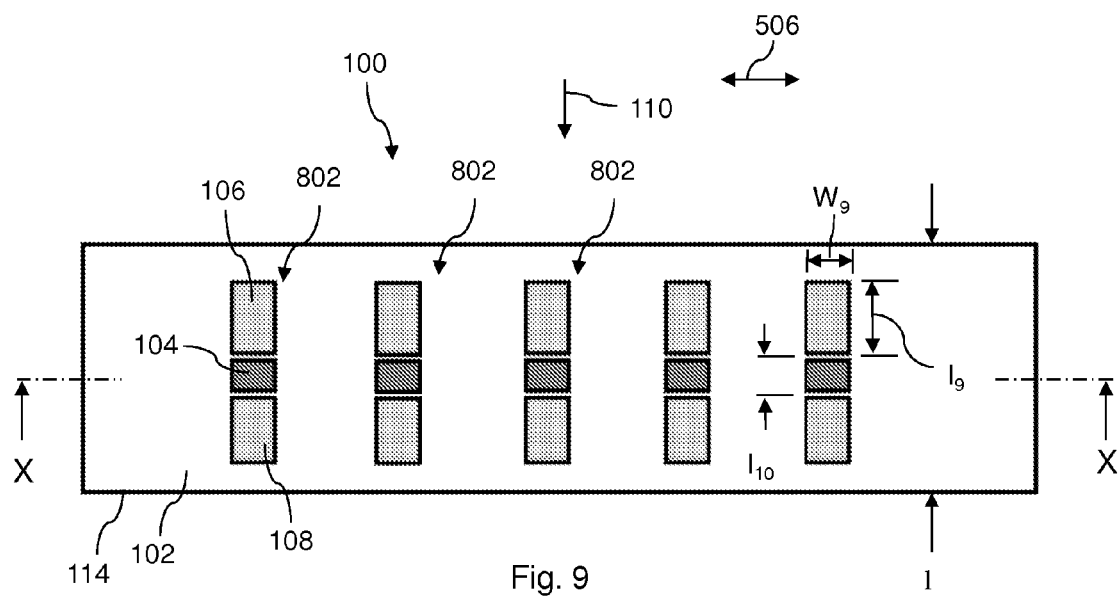
FIG. 9 shows a top view of a tape head system according to a further embodiment.

FIG. 9 shows in a top view a tape head system 100 according to a further embodiment.

Again, electrostatic elements 106, 108 and a read and/or write element 104 are arranged in clusters 802 on the head 102 or substrate 114. The electrostatic elements 106, 108 may each have a length $l_9$ in the direction 110 of travel between 100 μm and 2 mm. Also, the electrostatic elements 106, 108 may each have a width $w_9$ in the crosswise direction 506 between 10 μm and 500 μm. The length $l_{10}$ of each read and/or write element 104 may range between 10 μm and 200 μm, for example. The width the read and/or write element 104 may be equal to or smaller than the width $w_9$ of the electrostatic elements 106, 108, for example.

Figure 10:
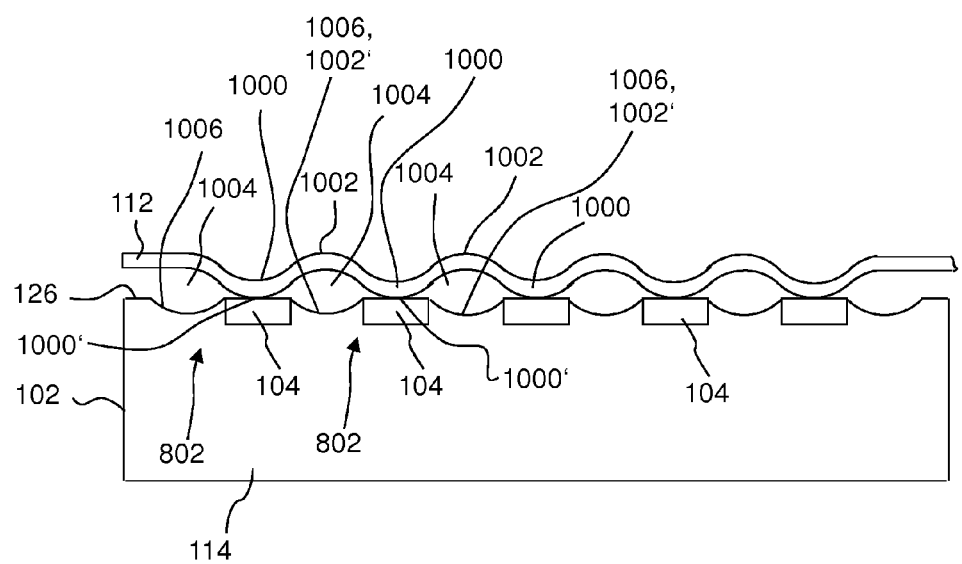
FIG. 10 shows a section X-X taken from FIG. 9.

FIG. 10 shows a cross-section X-X taken from FIG. 9.

During reading and writing operations, a controller 116 (not shown) applies a potential to the electrostatic elements 106, 108, which results in a warpage of the tape 112 in a direction 506 crosswise to the direction of travel 110 of the tape 112. The warpage is comprised of troughs 1000 forming first sections of the tape 112 in contact or in close relationship with each read and/or write element 104 (first section 1000' of the head 102). In between the troughs 1000, the magnetic tape 112 comprises ridges 1002 forming second sections of the tape 112 spaced apart from the surface 126 of the head 102 (second sections 1002' of the head 102), thus forming multiple air bearings 1004 between adjacent clusters 802.

In the region of the ridges 1002, the surface 126 of the head 102 may be formed with concave bevels 1006 to increase the size of the air bearings 1004 in a direction perpendicular to the surface 226. The bevels 1006 may each stretch over the entire length l (see FIG. 9) of the head 102.

FIGS. 11 to 14 show heads 102, each in a top view, according to different embodiments.

Figure 11:
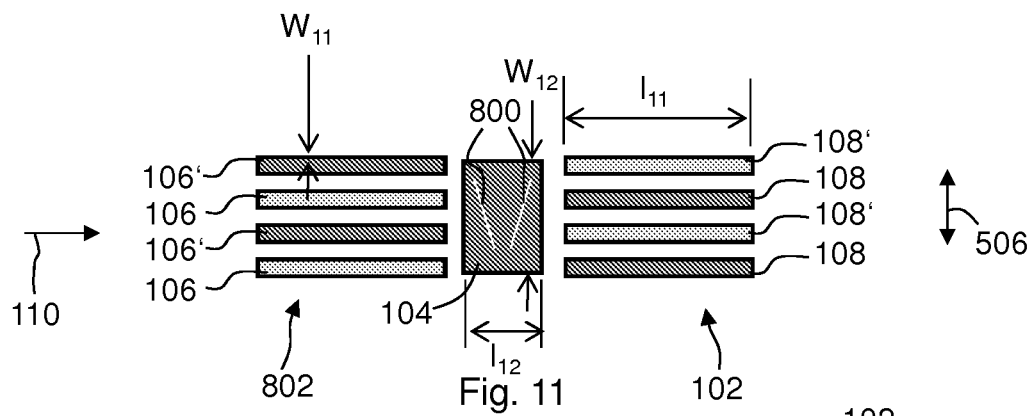
FIGS. 11 to 14 each show a top view of a read and/or write head according to different embodiments.

According to the embodiment of FIG. 11, the electrostatic elements 106, 106', 108, 108' are each formed as stripes arranged, having regard to the direction of travel 110 of the tape 112, before and after the read and/or write element 104 and extending in the direction of travel 110 of the tape 112. The stripes are arranged parallel to one another in the crosswise direction 506.

The electrostatic elements 106, 108 may each have a length $l_{11}$ in the direction 110 of travel between 100 μm and 2 mm. Also, the electrostatic elements 106, 108 may each have a width $w_{11}$ in the crosswise direction 506 between 3 μm and 200 μm.

The length $l_{12}$ of each read and/or write element 104 may range between 10 μm and 200 μm. The width $w_{12}$ of the read and/or write element 104 may range between 10 μm and 200 μm.

Figure 12:
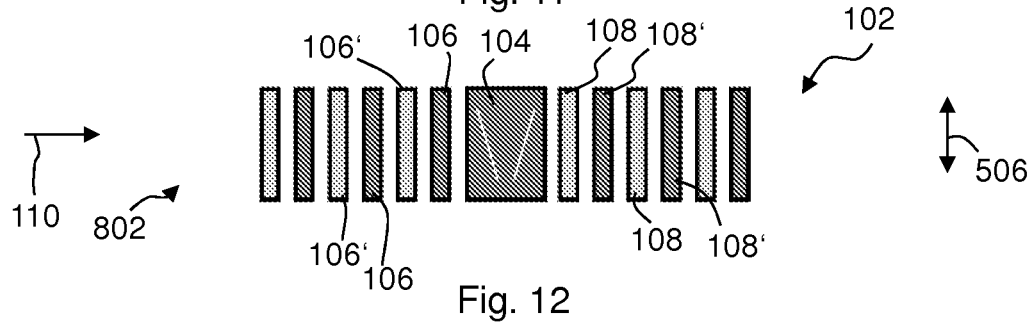

According to the embodiment of FIG. 12, the electrostatic elements 106, 106', 108, 108' are formed as stripes arranged, having regard to the direction of travel 110 of the tape 112, before and after the read and/or write element 104 and extending in the crosswise direction 506. The stripes are arranged parallel to one another in the direction of travel 110 of the tape 112.

Figure 13:
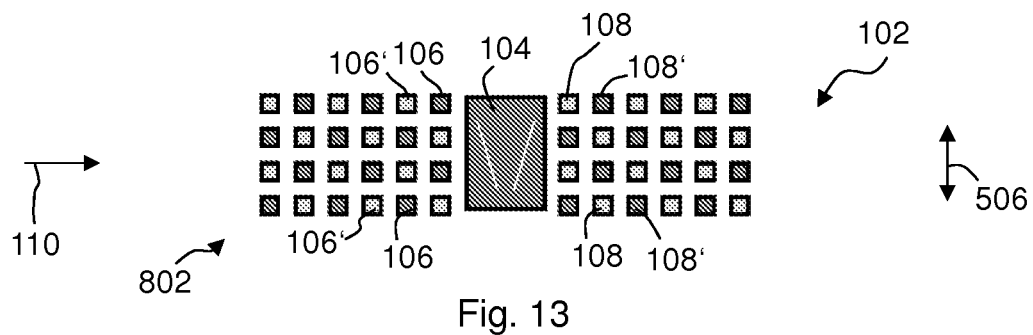

According to the embodiment of FIG. 13, the electrostatic elements 106, 106', 108, 108' are formed as squares, having regard to the direction of travel 110 of the tape 112, before and after the read and/or write element 104.

Figure 14:
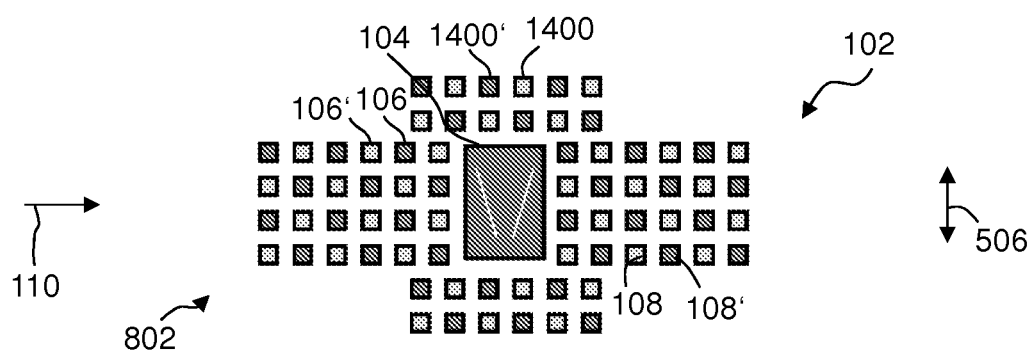

According to the embodiment of FIG. 14, the electrostatic elements 106, 106', 108, 108' are arranged, having regard to the direction of travel 110 of the tape 112, before and after the read and/or write element 104. In addition, the head 102 of FIG. 14 comprises electrostatic elements 1400, 1400' arranged on the sides of the read and/or write element 104 facing in the crosswise direction 506. Thus, the read and/or write element 104 is completely surrounded by electrostatic elements. The explanations with regard to the electrostatic elements 106, 106' apply mutatis mutandis to the electrostatic elements 1400, 1400'.

A head 102 may comprise multiple of the clusters 802 shown in any one of the FIGS. 11 to 14.

Figure 15:
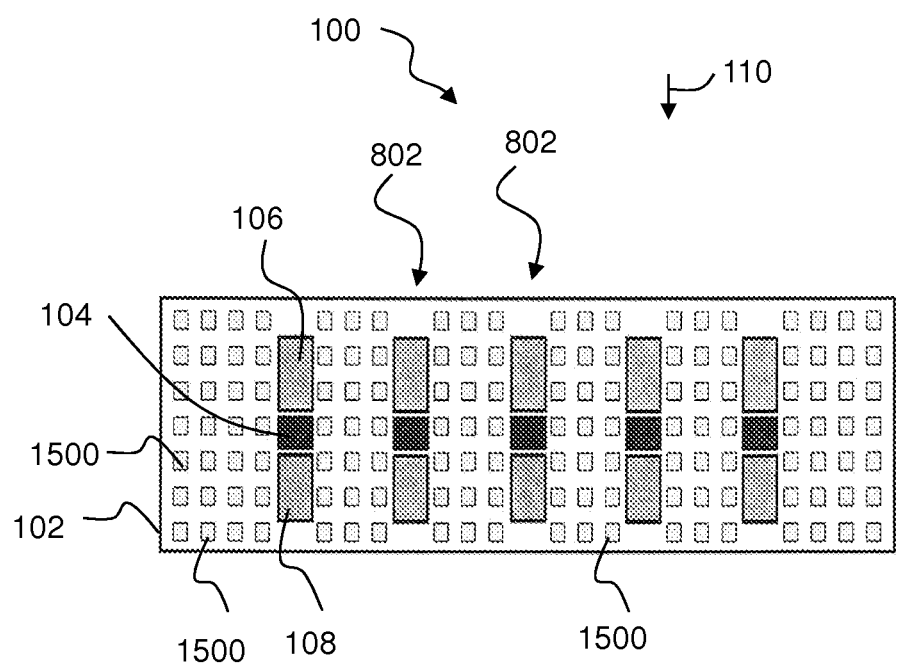
FIG. 15 shows a top view of a tape head system according to a further embodiment similar to FIG. 9.

The embodiment of FIG. 15 is largely based on the embodiment of FIG. 9 and shows a head 104 comprising a plurality of electrostatic elements 1500 arranged around each cluster 802 comprising the read and/or write element 104 and electrostatic elements 106, 108. The electrostatic elements 1500 are island shaped. Each of the electrostatic elements 1500 is grounded by the controller 116 or otherwise controlled (as described in connection with one of the previous embodiments). The electrostatic elements 1500 may be configured to reduce wear of the head 102 and may be formed from metal to this end. In one embodiment, the electrostatic elements 1500 ensure wear-free operation, and the distances $d_1, d_2, d_3, d_4$ (see FIG. 1) are controlled via the electrodes 106, 108. The controller 116 controls the electrostatic elements 106, 108, 1500 accordingly.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. This is particularly true of the controller 116 described above. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims. In particular, the embodiments of FIGS. 1 to 15 may be combined with one another as required.

The invention claimed is:

1. A tape head system comprising:
 a read and/or write head having at least one read and/or write element configured to read from and/or write to magnetic tape and at least one electrostatic element arranged adjacent to the read and/or write element, wherein the at least one electrostatic element and the at least one read and/or write element form a cluster, wherein multiple clusters are arranged on the head; and
 a controller configured to apply a potential to the at least one electrostatic element, and to control the at least one electrostatic element of each cluster so that the magnetic tape only contacts or is arranged in close relationship with the head along first sections of the head and is spaced apart from the head at second sections of the head in between the first sections by an air bearing respectively, the head being formed with a bevel at at least one of the second sections.

2. The tape head system of claim 1, wherein the controller is configured to ground the at least one electrostatic element.

3. The tape head system of claim 1, wherein the controller is configured to apply a potential to the at least one electrostatic element so as to compensate for a work function.

4. The tape head system of claim 1, wherein the controller is configured to apply a potential to the at least one electrostatic element so as to maintain a controlled spacing between the magnetic tape and the head, the controller being configured as a closed-loop feedback controller so as to maintain the controlled spacing between the magnetic tape and the head.

5. The tape head system of claim 1, further comprising a tensioning unit for tensioning the magnetic tape, wherein the controller is configured to apply a potential to the at least one electrostatic element so as to pull the magnetic tape towards the read and/or write head for reading and/or writing.

6. The tape head system of claim 1, wherein at least two electrostatic elements are arranged before and after the read and/or write element in a direction of travel of the magnetic tape.

7. The tape head system of claim 6, wherein a first section of the head in contact or in close relationship with the magnetic tape extends only from one electrostatic element to another electrostatic element with the at least one read and/or write element arranged in between.

8. The tape head system of claim 1, wherein at least a first and a second electrostatic element are arranged before and at least a third and a fourth electrostatic element are arranged after the at least one read and/or write element.

9. The tape head system of claim 8, wherein the controller is configured to apply the same or opposite potentials to the electrostatic elements.

10. The tape head system of claim 9, wherein the controller is configured to apply opposite potentials to the first and second electrostatic elements as well as to the third and fourth electrostatic elements.

11. The tape head system of claim 8, wherein the first and second and/or third and fourth electrostatic element are arranged, with respect to a direction of travel of the magnetic tape, behind or next to each other.

12. A method for operating a tape head system, comprising a read and/or write head having at least one read and/or write element configured to read from and/or write to magnetic tape and at least one electrostatic element arranged adjacent to the read and/or write element, wherein the at least one electrostatic element and the at least one read and/or write element form a cluster, wherein multiple clusters are arranged on the head, the method comprising:
 applying, with a controller, a potential to the at least one electrostatic element, and controlling the at least one electrostatic element of each cluster so that the magnetic tape only contacts or is arranged in close relationship with the head along first sections of the head and is spaced apart from the head at second sections of the head in between the first sections by an air bearing respectively, the head being formed with a bevel at at least one of the second sections.

* * * * *